(12) United States Patent
Matthess et al.

(10) Patent No.: US 11,527,989 B2
(45) Date of Patent: Dec. 13, 2022

(54) STOP ELEMENT FOR A SOLAR MODULE MOUNTING

(71) Applicant: HANWHA Q CELLS GMBH, Bitterfeld-Wolfen (DE)

(72) Inventors: Uwe Matthess, Dessau (DE); Heiko Molitor, Leipzig (DE)

(73) Assignee: HANWHA Q CELLS GMBH, Bitterfeld-Wolfen (DE)

( * ) Notice: Subject to any disclaimer, the term of this patent is extended or adjusted under 35 U.S.C. 154(b) by 144 days.

(21) Appl. No.: 17/048,987

(22) PCT Filed: Apr. 1, 2019

(86) PCT No.: PCT/EP2019/058198
§ 371 (c)(1),
(2) Date: Oct. 19, 2020

(87) PCT Pub. No.: WO2019/201581
PCT Pub. Date: Oct. 24, 2019

(65) Prior Publication Data
US 2021/0242825 A1  Aug. 5, 2021

(30) Foreign Application Priority Data
Apr. 19, 2018  (DE) .................. 102018109336.5

(51) Int. Cl.
*H02S 30/10* (2014.01)
*H01R 4/64* (2006.01)

(52) U.S. Cl.
CPC .............. *H02S 30/10* (2014.12); *H01R 4/64* (2013.01)

(58) Field of Classification Search
None
See application file for complete search history.

(56) References Cited

FOREIGN PATENT DOCUMENTS

| DE | 202008000997 U1 | 5/2008 |
| DE | 102012007535 A1 | 10/2013 |
| EP | 1947402 A1 | 7/2008 |
| EP | 2574386 A2 | 3/2013 |

OTHER PUBLICATIONS

Eng Translation DE 20 2008 000997U1, accessed May 7, 22 (Year: 2008).*

* cited by examiner

*Primary Examiner* — Shannon M Gardner
(74) *Attorney, Agent, or Firm* — Christensen, Fonder, Dardi & Herbert PLLC

(57) ABSTRACT

A stop element for at least one solar module holder, which can be fastened to a substructure by means of fastening means. The stop element comprises: two opposite stop portions and at least one connecting element that connects the two opposite stop portions. One of the two stop portions is coupled to the at least one solar module holder, and the other of the two stop portions is coupled to the fastening means or to a further solar module holder in order to generate a torque on the solar module holder caused by a load.

9 Claims, 3 Drawing Sheets

STOP ELEMENT FOR A SOLAR MODULE MOUNTING

PRIORITY CLAIM

The present application is a National Phase entry of PCT Application No. PCT/EP2019/058198, filed Apr. 1, 2019, which claims priority from German Patent Application 10 2018 109 336.5, filed Apr. 19, 2018, the disclosures of which are hereby incorporated by reference herein in their entirety.

FIELD OF THE INVENTION

The present invention relates to a stop element for at least one solar module holder and in particular to a clamping clasp in order to achieve a permanently stable attachment of the solar module to a substructure.

BACKGROUND

One problem with the fastening of solar modules by means of module clamps is that in the case of very high tensile loads (e.g. caused by wind), a fastening to a substructure can become unstable. This can lead to the solar module slipping or twisting out of the module clamps if, for example, high suction loads act on the solar modules. This slipping out of the module from the module clamps is also referred to as a loss of position.

The loss of position depends on the module rigidity, on the rigidity of the module clamp and on the mounting rail. Depending on these stiffnesses, increased tensile loads lead to the deformation or torsion of the module and the module frame, for example. The deformation and torsion of the module lead to the frame slipping out of the module clamps, which in turn leads to a greater laminate deflection. The deflection of the laminate in turn leads to an increased risk of cell breakage.

So far, attempts have been made to prevent these problems by increasing the number of module clamping points (fastening points) from its current number of 4 to 6 or more. For these additional two module clamping points, however, additional substructure rails had to be installed in the center of the module, which causes additional installation work and additional costs. Another solution was to use special module clamps that withstand the required suction load. Another approach was to delimit the module clamping regions.

However, all of these solutions are associated with increased effort.

In DE 20 2008 000 997 U1, a fastening system is disclosed which fastens two modules by a latching mechanism of a fastening device against each other and on a frame. The two modules are then positioned edge to edge with each other. By this, a slipping or twisting out of position can be prevented, but only as long as two modules are inserted together. The fastening device is merely clamped to the frame. The fastening of the modules to the frame is therefore accomplished only by means of latching and clamping two neighboring modules. A fastening at a boundary, or if there is an interspace between the modules, is therefore not possible.

Furthermore, the document EP 2 573 486 A2 discloses a fastening system by which two modules are fixed to a support beam by an interlocking element located between them. For each module, the interlocking element is equipped with a clamping means, under which the frame of the module can be fixed. This fastens the respective module against tensile forces, but cannot counteract torques acting on the module.

There is therefore a need for an improved fastening of solar modules to the substructure, which prevents the solar module from losing its position even under high tensile loads.

BRIEF DESCRIPTION OF THE INVENTION

At least some of the above-mentioned problems are solved by a stop element according to claim 1. The dependent claims relate to advantageous developments of the stop element according to claim 1.

The present invention relates to a stop element for at least one solar module holder, which can be fastened to a substructure by means of a fastening device or assembly, also referred to as a fastening means. The stop element comprises: two opposite stop portions and at least one connecting element that connects the two opposite stop portions. One of the two stop portions can be coupled to the at least one solar module holder and the other stop portion can be coupled to the fastening means or to a further solar module holder in order to absorb a torque on the solar module holder caused by a load. In particular, the aim is to prevent the solar module holder from being twisted out of the fastening means.

The solar module holder(s) can in particular be designed as module clamp(s) in which a solar cell module can be held by a clamp connection. These module clamps are connected to the substructure at several module clamping points (fastening points).

Optionally, the stop element is monolithic (e.g., made of a metal) and can be placed on the substructure. It can therefore lie loosely between the substructure and the solar module holder. It does not have to be monolithic, however. Rather, the at least one connecting element can also comprise several parts that can be connected, for example, to the opposite stop portions or that can have one or more ropes/lines/webs to connect the stop portions.

Optionally, the two opposite stop portions are formed as V-shaped portions that provide a stop for absorbing the torque. In addition, the at least one connecting element can couple at end points of the V-shaped sections and run laterally along the substructure. Advantageously, connecting elements are provided at each end point of the V-shaped portions so that the stop element forms a through opening in which, for example, a contact point or fastening point can be placed between the solar module holder of the substructure.

Optionally, slots are formed on the two opposite stop portions into which at least a part of the solar module holder can be pushed. A better hold/stop of the stop element on the solar module holder can hereby be achieved. These slots also make it possible for the stop element not to be attached to a fastening point of the solar module holder on the substructure but in any region between two adjacent solar module holders (which then support each other). Each stop portion can therefore have a respective slot in order to slide the stop element along adjacent solar module holders (when they are inserted into the slots). The slots ensure a form-fitting hold.

Optionally, the two opposite stop portions and/or the connecting element are formed from a metal in order to make an electrical potential equalization between the substructure and the solar module holder possible.

The present invention also relates to a solar module installation with at least one solar module; at least one solar module holder that holds the at least one solar module; a substructure on which the at least one solar module holder is fastened together with the respective solar module; and at least one previously defined stop element. The stop element can be arranged between the solar module holder and the substructure in order to prevent the solar module holder from twisting relative to the substructure due to the load. The stop element can be formed or arranged in such a way that a flow of force is possible between adjacent solar module holders or to the fastening means via the stop element.

Embodiments thus solve at least some of the problems mentioned at the beginning by means of a simple additional form-fitting connection concept between the module holders (module clamp) or to the connection means. The use of the stop element furthermore allows for the use of conventional standard module holders. Equipotential bonding can also be easily integrated.

BRIEF DESCRIPTION OF THE DRAWINGS

The embodiments of the present invention will be better understood from the following detailed description and the accompanying drawings, which should not be construed as limiting the disclosure to the specific embodiments but are for explanation and understanding only.

DETAILED DESCRIPTION

FIG. 1A-1D show a stop element for two solar module holders 41, 42, which are fastened to a substructure 50 with fastening means 60.

Figure 1A:
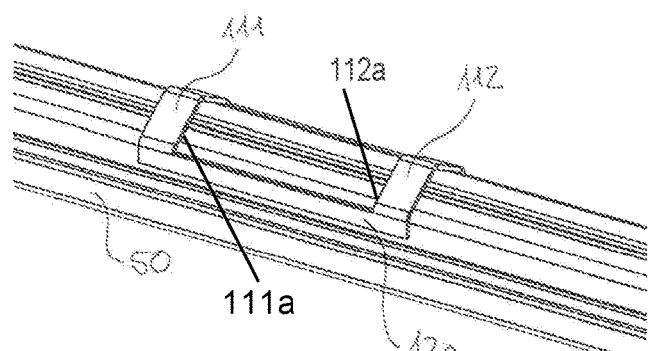
FIG. 1A-1D show a stop element for a solar module holder according to one embodiment of the present invention.

FIG. 1A shows a stop element which is placed on a substructure 50. The stop element shown comprises two opposite stop portions 111 (first stop portion), 112 (second stop portion), which are connected to two connecting elements 120. First stop portion 111 includes first abutment surface 111a and second stop portion 112 includes second abutment surface 112a. In the embodiment shown, the stop element is monolithic (for example made from a metal). In further embodiments, however, the stop element does not have to be monolithic. The stop portions 111, 112 can, for example, also be connected to other connecting elements (such as ropes or the like).

Figure 1B:
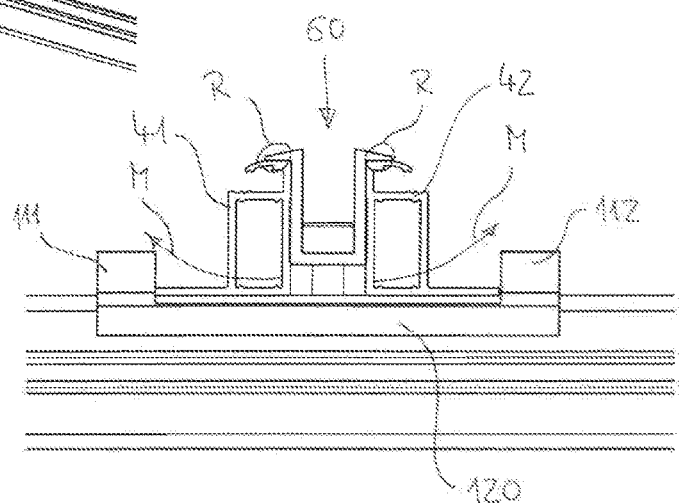

FIG. 1B shows a cross-sectional view through the attached solar module holders 41, 42, which are laterally supported by the two stop portions 111, 112 and fastened to the substructure 50 with fastening means 60. The fastening means 60 are formed between the adjacent solar module holders 41, 42.

The problem solved by the invention is that with increasing tensile load on the fastening means 60, which for example acts on solar modules due to the wind load, a torque M acts on the solar module holders 41, 42 around the rotation areas R (see FIG. 1B). This can cause the inserted solar modules to twist out of the solar module holders 40. The stop element according to embodiments prevents such a twisting of the solar module holders 41, 42, since the two stop portions 111, 112 offer a stop for the solar module holders 41, 42 which can absorb the torque M.

Figure 1C:
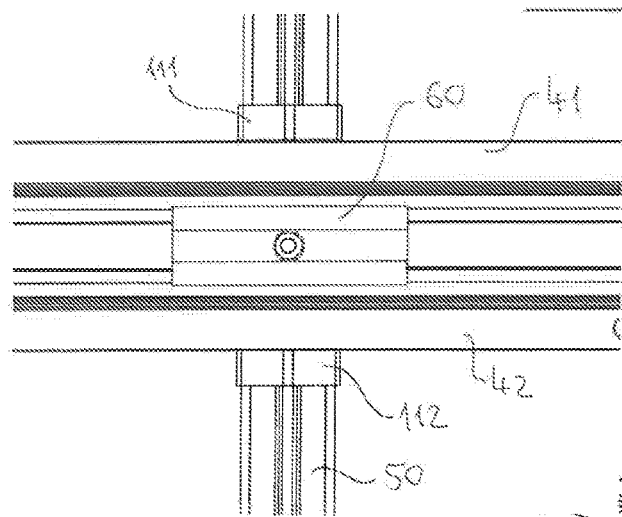
Figure 1D:
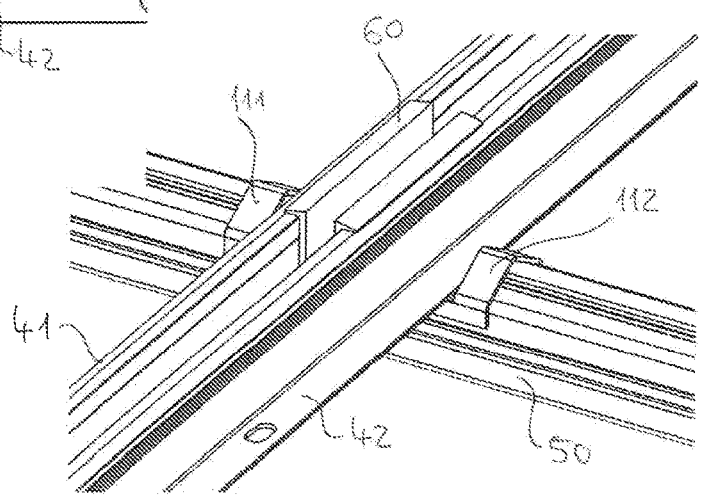

FIG. 1C shows a plan view of the embodiment shown, wherein the fastening means 60 can be seen as formed between the adjacent solar module holders 41, 42. FIG. 1D shows a corresponding spatial view of the two solar module holders 41, 42 used, which are held in a torsion-proof manner by the stop portions 111, 112 in the event of a tensile load (vertically upwards in FIG. 1B).

According to the embodiment shown, the stop element is substantially formed as a rectangular loop which extends around the fastening point between the solar module frames 41, 42 and the substructure, with the V-shaped stop portions 111, 112 providing a secure stop. In this way, a permanent and stable attachment of the solar modules to the substructure is achieved, even at very high wind load requirements.

FIG. 2A-2D show a further embodiment of the present invention in which only one solar module holder 40 is inserted into the stop element.

Figure 2A:
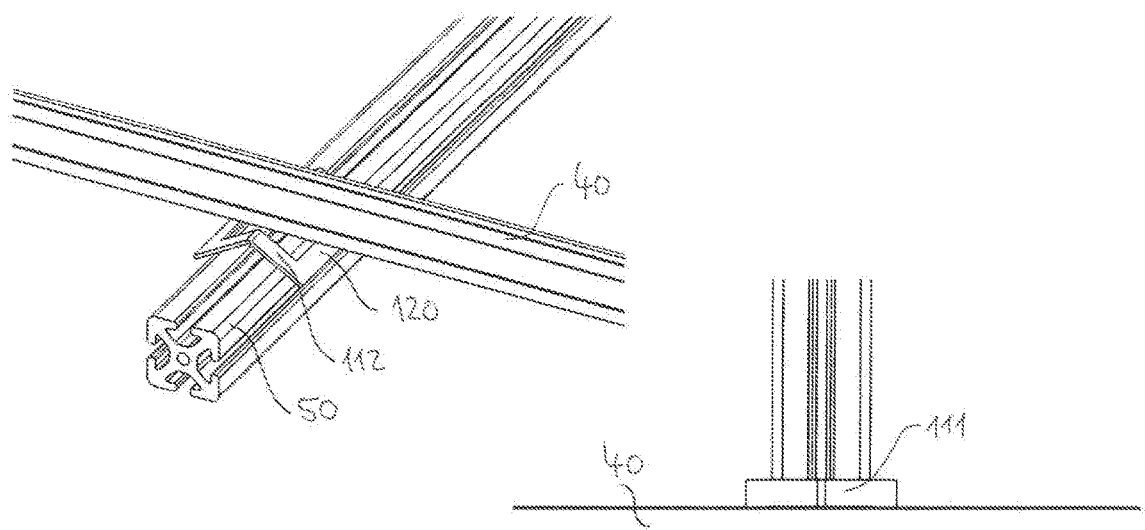
FIG. 2A-2D show a further embodiment for the stop element.
Figure 2B:
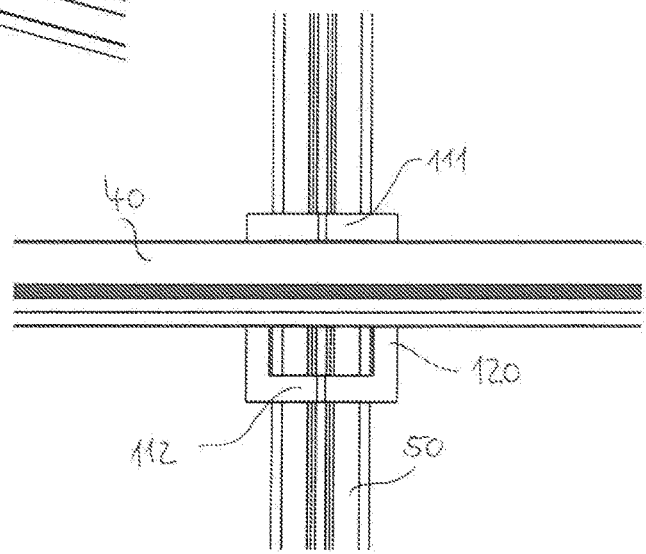
Figure 2C:
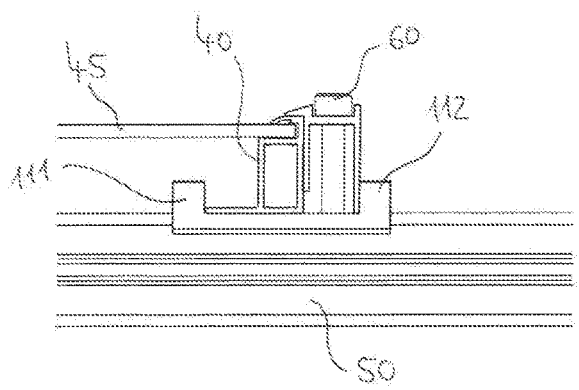
Figure 2D:
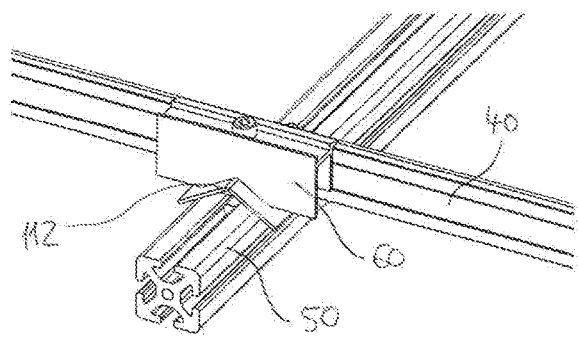

FIG. 2A initially shows that after the stop element and the solar module holder 40 have been placed on the substructure 50. The fastening means 60 (see spatial view of FIG. 2D) can be used in the space that remains free (see plan view of FIG. 2B). Finally, FIG. 2C shows a cross-sectional view along the substructure, where a solar module 45 is likewise being inserted into the solar module holder 40. The solar module 45 can be held in the solar module holder 40 in a clamping manner.

The stop portions 111, 112 again form V-shaped projections which prevent a rotation about an axis of rotation perpendicular to the plane of the drawing in FIG. 2C by holding the solar module holder 40 and the connecting means 60 together.

In this embodiment, the stop element is formed as a rectangular plate (contour) with a rectangular opening, with the stop element being folded along a line that extends, for example, in the center parallel to one of the rectangular edges. As a result, the stop element projects beyond a side edge of the substructure in a plan view (see FIG. 2B). In comparison to this, the stop element in FIG. 1A-1D is formed by further folded edges which laterally bend the respective parallel rectangular edges so that they run parallel to a surface of the substructure 50 in terms of area.

Of course, the stop elements between adjacent solar module holders 41, 42 (see FIGS. 1A-1D) and to the fastening means 60 (see FIG. 2A-2D) can also be formed in the same way by a single fold as in FIG. 2A-2D or multiple folds as in FIG. 1A-1D.

FIG. 3A-3D show a further embodiment which differs from the embodiments shown above only in that a slot 113, 114 is formed in both the first stop portion 111 and the second stop portion 112.

Figure 3A:
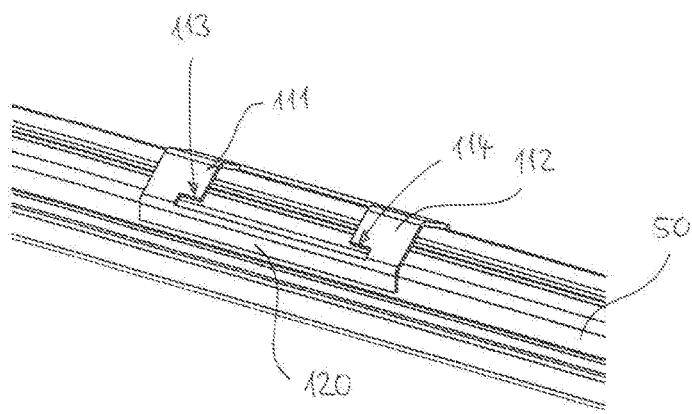
FIG. 3A-3D show another embodiment of the stop element.
Figure 3B:
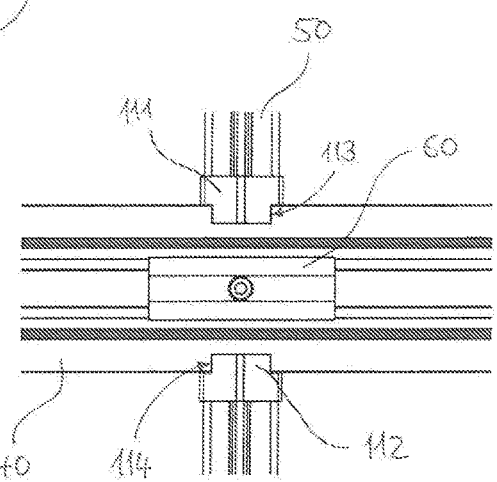
Figure 3C:
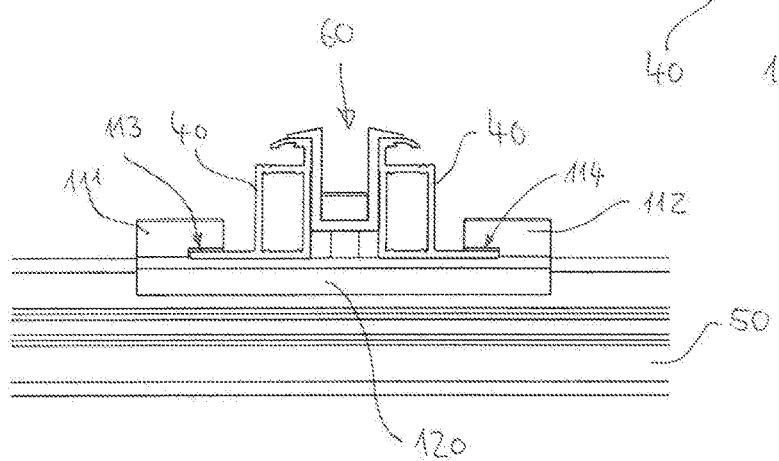
Figure 3D:
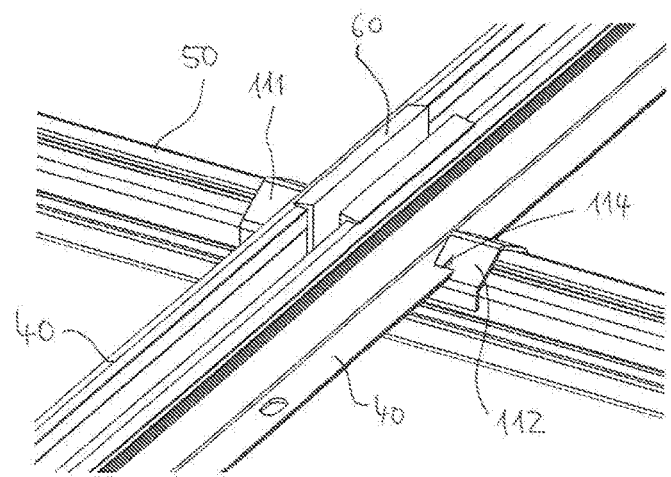

These slots 113, 114 are formed, for example, in such a way that after the stop element has been placed on the substructure 50 (see FIG. 3A), they can each receive a portion of the solar module holder(s) 40 (see FIGS. 3B and 3C). This ensures that after the solar module holder(s) 40 has/have been pushed in, a vertical movement of the solar module holder(s) 40 is not possible (for example before the fastening by means of the fastening means 60). After the solar module holder(s) 40 has/have been pushed in, a fastening by means of the fastening means 60 can then take place (see FIGS. 3C and 3B). FIG. 3D again shows the result of fastening the solar module holder 40 to the substructure 50 using the stop element with the slots 113, 114.

The embodiments with the slots offer the advantage that the stop element does not necessarily have to be formed at a fastening point where the solar module holder 40 is fastened to the substructure 50. Rather, the stop element shown can be displaced parallel along the adjacent solar module holders 40 as a result of the slots 113, 114 and ensure a non-rotatable connection between the solar module holders 40 in any region.

Embodiments of the present invention thus define a simple technical solution for the quick attachment of solar modules on a substructure in which the solar modules can mainly be attached to transverse greases of common steel or aluminum profiles.

The embodiments offer the following advantages:

A currently existing limitation for permitted module tensile loads can be increased and is not limited by the loss of position.

Conventional standard clamps (module holders) can still be used. No reinforcements are required.

There are no restrictions on the module clamping region or the assembly variants required. In this way, a high degree of flexibility with regard to the module clamping region can be maintained.

No additional clamping points or additional substructures are required.

The stop element can also be used as a potential equalization between the solar modules and the substructure.

The risk of cell breakage is decreased due to the reduced deflection of the laminate.

The features of the invention disclosed in the description, the claims and the drawings may be essential for the realization of the invention either individually or in any combination.

LIST OF REFERENCE SIGNS

40,41,42 Solar module holders (e.g., module clamps)
50 Substructure
60 Fastening means
111, 112 Opposite stop portions
113, 114 Slots
120 Connecting element
R Point of rotation
M Effective torque around the point of rotation under tensile load

The invention claimed is:

1. A stop element for at least one solar module holder which can be fastened to a substructure by a fastening device, comprising:
    two opposing stop portions, including a first stop portion with a first abutment surface and a second stop portion with a second abutment surface, the first abutment surface facing the second abutment surface;
    at least one connecting element that connects the two opposing stop portions,
    wherein the first stop portion is configured to be coupled to the at least one solar module holder such that the first abutment surface contacts the at least one solar module holder, and the second stop portion is configured to be coupled to the fastening device or to a further solar module holder such that the second abutment surface contacts the fastening device or the further solar module holder, so that a load caused by a load torque on the solar module holder is absorbed by the first and second stop portions.

2. The stop element according to claim 1, wherein the stop element is formed monolithically and can be placed on the substructure.

3. The stop element according to claim 1, with the two opposing stop portions being formed as V-shaped portions which provide a stop for absorbing the torque, wherein the at least one connecting element couples at end points of the V-shaped portions and, after being placed on the substructure, runs laterally along the substructure.

4. The stop element according to claim 1, wherein at least one slot is formed on the two opposing stop portions, into which at least part of the solar module holder can be pushed.

5. The stop element according to claim 4, wherein two opposing stop portions each have a slot in order to allow the stop element to be displaced along adjacent solar module holders while the slots offer a form-fitting hold.

6. The stop element according to claim 1, wherein the two opposing stop portions and/or the connecting element are formed from a metal in order to make an electrical potential equalization between the substructure and the solar module holder possible.

7. The stop element according to claim 1, which is formed as a rectangular contour around a rectangular opening which is bent at least once along a line parallel to one of the rectangular edges.

8. A solar module installation with:
    at least one solar module;
    at least one solar module holder which holds the at least one solar module;
    a substructure on which the at least one solar module holder is fastened together with the respective solar module; and
    at least one stop element comprising:
        two opposing stop portions, including a first stop portion with a first abutment surface and a second stop portion with a second abutment surface, the first abutment surface facing the second abutment surface;
        at least one connecting element that connects the two opposing stop portions,
    wherein the first stop portion is configured to be coupled to the at least one solar module holder such that the first abutment surface contacts the at least one solar module holder, and the second stop portion is configured to be coupled to the fastening device or to a further solar module holder such that the second abutment surface contacts the fastening device or the further solar module holder, so that a load caused by a load torque on the solar module holder is absorbed by the first and second stop portions.

9. The solar module installation according to claim 8, wherein the at least one stop element is displaceably arranged along adjacent solar module holders, and
    wherein the at least one stop element has at least one slot that is formed on the two opposing stop portions, into which at least part of the solar module holder can be pushed.

* * * * *